United States Patent [19]

Pearson et al.

[11] 4,123,783
[45] Oct. 31, 1978

[54] MAGNETIC BUBBLE DISPLAY SYSTEMS

[75] Inventors: Ronald F. Pearson, Reigate; David E. Lacklison, Oxted; George B. Scott, Warnham; John S. Palfreeman, Brockham, all of England

[73] Assignee: U.S. Philips Corporation, New York, N.Y.

[21] Appl. No.: 664,821

[22] Filed: Mar. 8, 1976

Related U.S. Application Data

[63] Continuation of Ser. No. 547,943, Feb. 7, 1975, abandoned.

[30] Foreign Application Priority Data

Feb. 13, 1974 [GB] United Kingdom ............... 6477/74

[51] Int. Cl.² .............................................. H04N 5/66
[52] U.S. Cl. ............................ 358/230; 315/169 TV; 340/324 R; 340/337; 365/1; 365/10; 350/151; 358/232
[58] Field of Search ............... 358/90, 209, 217, 230, 358/232, 32; 340/174 YC, 324 R, 337, 174 TF; 350/151; 315/169 TV; 365/21, 23, 33, 1, 10

[56] References Cited

U.S. PATENT DOCUMENTS

| 3,460,116 | 8/1969 | Bobeck et al. | 365/21 |
| 3,526,883 | 9/1970 | Tabor | 358/232 |
| 3,662,102 | 5/1972 | Herndon | 358/83 |
| 3,893,023 | 7/1975 | Otala | 365/32 |
| 3,965,299 | 6/1976 | Lin | 358/230 |
| 3,971,887 | 7/1976 | Lin et al. | 358/230 |

OTHER PUBLICATIONS

H. Chang, Bubble Domain Composer, Display and Printer, 8-72, I.B.M. Tech. Discl., vol. 15, #3.
R. M. Craig, Bubble Domain Electronic-To-Optical Image Transducer, 6/70-I.B.M.-vol. 13 #1.

Primary Examiner—Robert L. Griffin
Assistant Examiner—Edward L. Coles
Attorney, Agent, or Firm—Frank R. Trifari; Daniel R. McGlynn

[57] ABSTRACT

A display arrangement including a source of polarized radiation; a magnetic material capable of supporting magnetic bubble domains in the path of the polarized beam, for producing a modulated beam; a device for representing an image encoded signal by means of the magnetic bubble domains; and a display device in the path of the modulated polarized beam for providing a visual display of the encoded image.

12 Claims, 2 Drawing Figures

MAGNETIC BUBBLE DISPLAY SYSTEMS

This is a continuation of application Ser. No. 547,943, filed Feb. 7, 1975, now abandoned.

This invention relates to image transmission systems and in particular to display units for use in the receivers of such systems.

The object of the invention is to utilize the magneto-optic properties of a magnetic bubble domain device in a low-cost display unitl capable of showing picture information transmitted over a communication channel, for example a low bandwidth telephone or mobile radio channel.

According to the invention there is provided a picture transmission system in which a transmitter includes means adapted to scan a picture in a boustrophedral pattern to produce an analog video signal, in which a receiver connectable to the transmitter by a communication channel includes a display unit, said display unit including a visible light source, polarizing and analyzing means, and a body capable of supporting magnetic bubble domains which has a transparent display area and a bubble shift register channel on the display area whose path corresponds to the complete boustrophedral scan pattern at the transmitter, and in which an analogu-to-digital converter at the transmitter or receiver is adapted to produce, from the analog video signal, serial binary information to be fed into the bubble shift register channel.

According to the invention there is also provided a display unit suitable for use in the above picture transmission system, said display unit including a visible light source, polarizing and analyzing means, and a body capable of supporting magnetic bubble demains which has a transparent display are and a bubble shift register channel on the display area whose path corresponds to the complete boustrophedral scan pattern at the transmitter.

The invention will now be described in more detail with reference to the accompanying drawings, in which.

Figure 1:
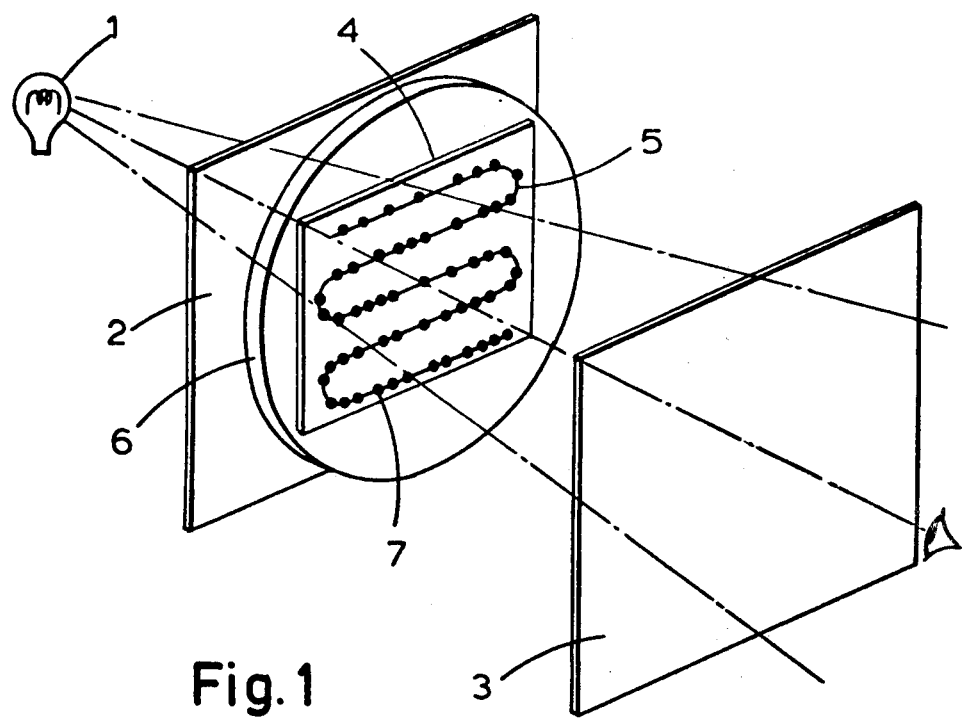
FIG. 1 shows a schematic outline in perspective view of a display unit.

Referring now to FIG. 1, the display unit includes a visible light source in the form of a lamp 1, a pair of crossed optical polarizing elements comprising a polariser 2 and an analyser 3, and a body 4 capable of supporting magnetic bubble domains which has a transparent display area between the polarizing elements and a single bubble shift register channel 5 whose path on the display area follows a boustrophedral (left to right to left) pattern. A coil 6 is also shown for providing a bubble supporting magnetic bias field normal to the body 4.

The bubbles 7 present in the shift register 5 each have a direction of magnetization opppsite to that of the surrounding material and so effect an opposite Faraday rotation on the light from the polarizer 2 which gives a corresponding difference in the intensity of light transmitted by the analyzer 3. An example of a suitable material for the body 4 is the monocrystalline bismuth substituted garnet $Bi_{0.8}Sm_{2.2}Ga_{1.0}Fe_{4.0}O_{12}$. This material has a magneto-optic figure of merit of 5°/dB corresponding to a ratio of Faraday rotation per cm./ Absorption coefficient, $\Lambda/\alpha = 22°$ at 560 nm. If operated between crossed polarizing elements so that there is zero light transmission with this material saturation magnetized in one direction, then a light transmission of 19% can be achieved when the magnetization of the material is reversed; this figure being uncorrected for polarisation and reflection losses. Experimental contrast ratios of 50 to 1 have been observed. The body 4 can be a plate cut from a crystal, polished to the desired thickness, and supported e.g. on a glass plate. An alternative is for the body 4 to be a layer epitaxially grown on a transparent non-magnetic crystal substrate, e.g. a rare-earth gallium garnet, which acts as a support.

Propagation of bubbles along the shift register channel 5 can be achieved by drive means, known per se, which create magnetic field gradients at selected points on a surface of the body 4. For example, the drive means can comprise current-carrying conductors which also define the channel 5 or external means for producing magnetic fields in conjunction with the channel 5 being defined by a magnetic overlay pattern on the body 4. The magnetic overlays can be produced directly by deposition of magnetic material, or by modifying the surface magnetic properties of the body 4 using ion implantation or etching so as to maintain the transparency of the body 4. An example is the socalled 'angel fish' overlay pattern which requires only an oscillating bias magnetic field for propagation. The shift register drive means will be adapted to be controlled by clock pulses. A bubble generator will be provided adapted to feed bubbles into the channel 5 in response to picture information in serial binary form and under the control of the clock pulses, and a bubble annihilator will be provided at the output end of the channel 5. The shift register drive means can also be adapted to the turned on and off by marker pulses before and after the serial binary picture information, and in this case there is no need to provide bubble detection means.

One of the factors which influence the contrast ratio of the display and hence its optical efficiency is the ratio of the bubble size to the bubble spacing. That is to say that large bubbles close together will give a high contrast ratio. For a given body 4, the bubble size is determined by the bias magnetic field, and the bubble spacing is determined by the structure of the shift register channel 5 which will require a certain bias magnetic field. It may be found that a bias field which is suitably low for large bubble size is lower than that required by a particular structure of the channel 5 giving small bubble spacing. A possible solution to this problem would be to use a high bias field for propagation of bubbles through the shift register, followed by reduction of the bias field to expand the bubbles when a stationary pattern of bubbles which is to be displayed has been formd.

It should be pointed out that the display has the advantage of possessing memory, that is to say that once a particular pattern of bubbles has been formed by propagation through the shift register channel 5, it can be viewed indefinitely as long as the magnetic bias field is present to support the bubbles. Thus permanent magnetic means could be provided. instead of the coil 6 shown in FIG. 1, to provide the bias field and thus be sufficient alone to maintain a particular bubble pattern. The permanent magnetic means might, for example, be in the form of a layer of permanent magnetic material on the body 4.

As described above, the display unit is adapted to be fed via an input to the single shift register channel 5 with information in serial binary form, and this is the form in which information can be easily transmitted over a communication channel, for example a low bandwidth telephone or mobile radio channel. The present state of the art of magnetic bubble shift registers is that such shift registers having a capacity of $10^4$ bits with an operating speed of 10 KHz are attainable, and this performance is sufficient for a display unit having a single shift register channel as described above to be provided in a receiver at one end of a low bandwidth telephone or mobile radio channel. For example, a still picture having $10^4$ elements could be fed into the shift register from a 3 KHz bandwidth telephone channel in approximately three seconds, an alpha-numeric message of 100 characters and 50 elements per character could be fed into the shift register from a 5 KHz bandwidth radio channel in one second, and an alpha-numeric message of 12 characters and 50 elements per character could be fed into the shift register from a 1.2 KHz bandwidth radio channel in half a second. In all these examples the capacity of the shift register relative to the bandwidth of the communication channel is such that the bubble pattern for a complete still picture is built up in the shift register during a time longer than the integration time of the eye. If required, illumination control means can be provided in the display unit whereby the display area is not illuminated during operation of the shift register.

It will be appreciated that if the bandwidth of the communication channel used is sufficiently large, then information can be received at such a speed as to enable the display unit to show moving pictures.

An example of the size of the display area of the body 4 shown in FIG. 1 is 2 mm square. This area would accommodate a shift register of capacity $10^4$ bits arranged as 100 lines with 100 elements per line, in which the elements, i.e. bubbles, are $10\mu$ diameter with $20\mu$ center-to-center spacing. As another example, an area 10 mm square would accommodate a shift register also of $10^4$ bits capacity but with bubbles of $50\mu$ diameter. These display areas could be directly viewed with a magnification of x 10 produced by a lens arranged between the analyzer 3 and the viewer. In the two examples just given, this would produce picture of 2 cm square and 10 cm respectively. The display unit giving a 2 cm square picture could be compact enough to be incorporated in a hand-held portable radio receiver.

One possible variation of the viewing arrangement of the display unit shown in FIG. 1 is to have the analyzer 3 on the same side of the body 4 as the polariser 2, with a mirror behind the channel 5 so that the picture is seen by reflection rather than transmission. In this case it may be possible to combine the polarizer 2 and the analyzer 3 in a single polarizer which is traversed by both the incident and the reflected light. It is to be noted that for a given magneto-optic effect, half the thickness of the body 4 is required when used in the reflection mode compared with the thickness required when used in the transmission mode.

Figure 2:
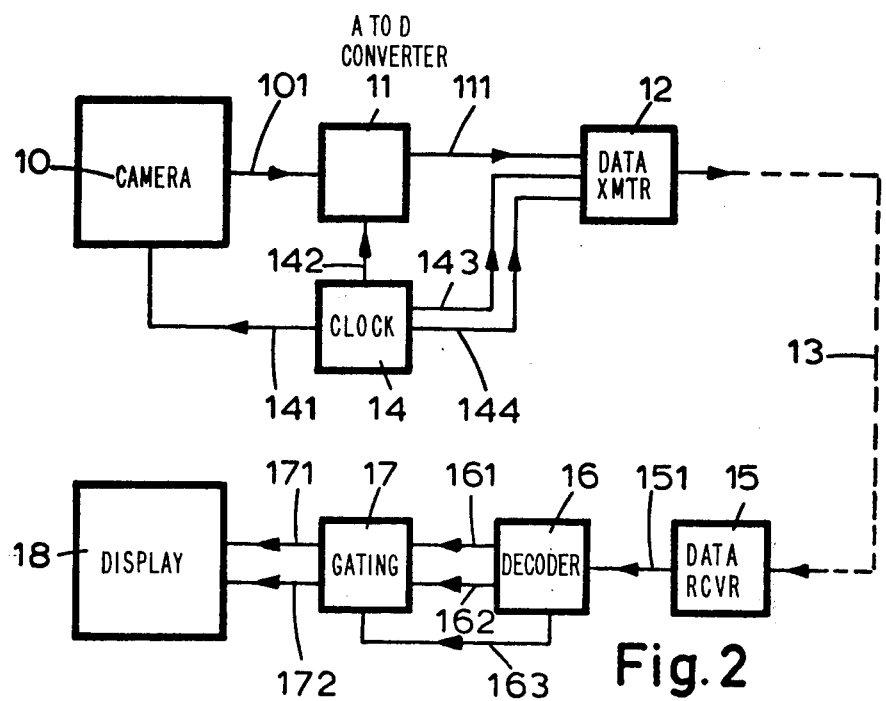
FIG. 2 shows a block schematic circuit diagram of a picture transmission system including the display unit of FIG. 1.

Referring now to FIG. 2, a complete picture transmission system is shown including the display unit of FIG. 1. At the transmitter there is a television camera 10 constituting means to scan a picture, an analog-to-digital converter 11 connected between the output of the television camera 10 and a data transmitter 12 adapted to be coupled to a communication channel 13, and a clock unit 14 for controlling the camera, converter, and data transmitter.

The camera 10 is adapted to scan a picture in a boustrophedral (left to right to left) pattern, i.e. in general terms the scan is triangular rather than sawtooth. In more precise terms, the complete boustrophedral scan pattern of the camera 10 and the boustrophedral path of the bubble shift register channel in the display unit should correspond as closely as possible. The analog video signal output 101 of the camera 10 is converted by the analog-to-digital converter 11 into serial binary information 111 which is fed to the data transmitter 12. The clock unit 14 provides synchronization pulses 141 to control the scan of the camera 10, clock pulses 142 to control the converter 11, marker pulses 143 which are transmitted by the data transmitter 12 at the beginning and at the end of the binary information 111 derived from each complete scan of the camera 10, and clock pulses 144 to control the data transmitter 12.

At the receiver there is a data receiver 15 adapted to be coupled to the communication channel 13, a decoder unit 16 to extract from the received data 151 the serial binary picture information 161, the clock pulses 162 and the marker pulses 163, and a gating unit 17 which in response to the inputs 161, 162 and 163 provides clocked serial binary information 171 to the bubble generator of the display unit 18 and also pulses 172 (i.e. clock pulses preceded and followed by marker pulses) to the shift register drive means of the display unit 18.

One possible variation of the above-described system is to transmit only frame synchronization pulses at the beginning of each picture, instead of marker pulses at the beginning and end of each picture. However, this would require the display unit to have a bubble detector at the output of the shift register which would respond to the passage of the frame synchronization pulses to determine when the bubble pattern for a complete picture is in the shift register.

If required, the analog-to-digital converter 11 can include means for coding the serial binary information so as to enable the display unit 18 to show a grey scale picture. For example, the serial binary information can be coded to produce a pattern of bubbles in the shift register whose spacing is modulated so as to effectively produce a grey scale picture. Such a coding method is the subject of our pending U.S. patent application No. 436,515, now abandon.

What is claimed is:

1. A picture transmission system comprising:
   means for scanning an original image of arbitrary shape in a boustrophedral pattern to produce a video signal;
   means for digitally transmitting said video signal along a communication channel;
   means for receiving said video signal from said communication channel; and
   means for displaying said original image comprising a source for emitting a beam of radiation; a magnetic material supporting a single magnetic bubble domain shift register channel covering a display area in a pattern corresponding to said boustrophedral scan, said channel being connected to said means for receiving being located in the path of said beam and functioning to produce a modulated beam displaying said original image from an image encoded signal applied thereto from said receiving means; and screen means in the path of said modulated beam for providing a visual display of said original image.

2. The arrangement as defined in claim 1 further comprising permanent magnetic means for providing a bubble-supporting magnetic bias field substantially normal to said magnetic material.

3. The arrangement as defined in claim 1, wherein said source is a visible light source.

4. A system as defined in claim 3, wherein said visible light source is a lamp.

5. A system as defined in claim 1, further comprising first polarizing means situated between said source and said magnetic material for polarizing said radiation beam.

6. A system as defined in claim 5, wherein said screen means comprises second polarizing means.

7. The arrangement as defined in claim 1, wherein said magnetic material comprises a transparent channel bubble shift register in the form of a boustrophedral pattern.

8. The arrangement as defined in claim 7, wherein said producing means comprises gating means for providing clocked serial binary information to said shift register.

9. A combination as defined in claim 7, wherein said scanning means comprises a camera for scanning a scene and having an analog output, analog-to-digital conversion means having an input connected to said analog output of said camera, and a digital output for producing said encoded signal.

10. The arrangement as defined in claim 9, wherein said representing means produces a sequence of bubbles in said shift register wherein the spacing between bubbles is modulated by said encoded signal for producing a grey scale picture on said screen means.

11. The arrangement as defined in claim 7, wherein the bit-storage of said shift register has sufficient bit-storage capacity relative to the bandwidth of said communication channel so that a still picture bubble pattern is developed in said shift register during a time longer than the integration time of the eye of a viewer.

12. A picture transmission system comprising:
   means for scanning an original image of arbitrary shape in a boustrophedral pattern to produce a video signal;
   means for digitally transmitting said video signal along a communication channel having a predetermined bandwidth;
   means for displaying said original image comprising a source for emitting a beam or radiation; a magnetic material supporting a single transparent magnetic bubble domain shift register channel covering a display area in the form of a boustrophedral pattern, the bit-storage of said shift register channel having sufficient bit-storage capacity relative to the bandwidth of said communication channel so that a still picture bubble pattern is developed in said shift register channel during a time longer than the integration time of the eye of a viewer, said shift register channel being connected to said communication channel and located in the path of said beam for producing a modulated beam displaying said original image from an image encoded signal applied thereto from said communication channel; and screen means in the path of said modulated beam for providing a display of said original image.

* * * * *

UNITED STATES PATENT AND TRADEMARK OFFICE
CERTIFICATE OF CORRECTION

PATENT NO. : 4,123,783
DATED : October 31, 1978
INVENTOR(S) : RONALD F. PEARSON ET AL It is certified that error appears in the above-identified patent and that said Letters Patent are hereby corrected as shown below:

Column 1, line 11, "until" should be --unit--
line 27, "analogu" should be --analog--

Column 4, line 46, "abandon." should be --abandoned.--

Signed and Sealed this

Twenty-seventh Day of March 1979

[SEAL]

Attest:

RUTH C. MASON
Attesting Officer

DONALD W. BANNER
Commissioner of Patents and Trademarks